UNITED STATES PATENT OFFICE.

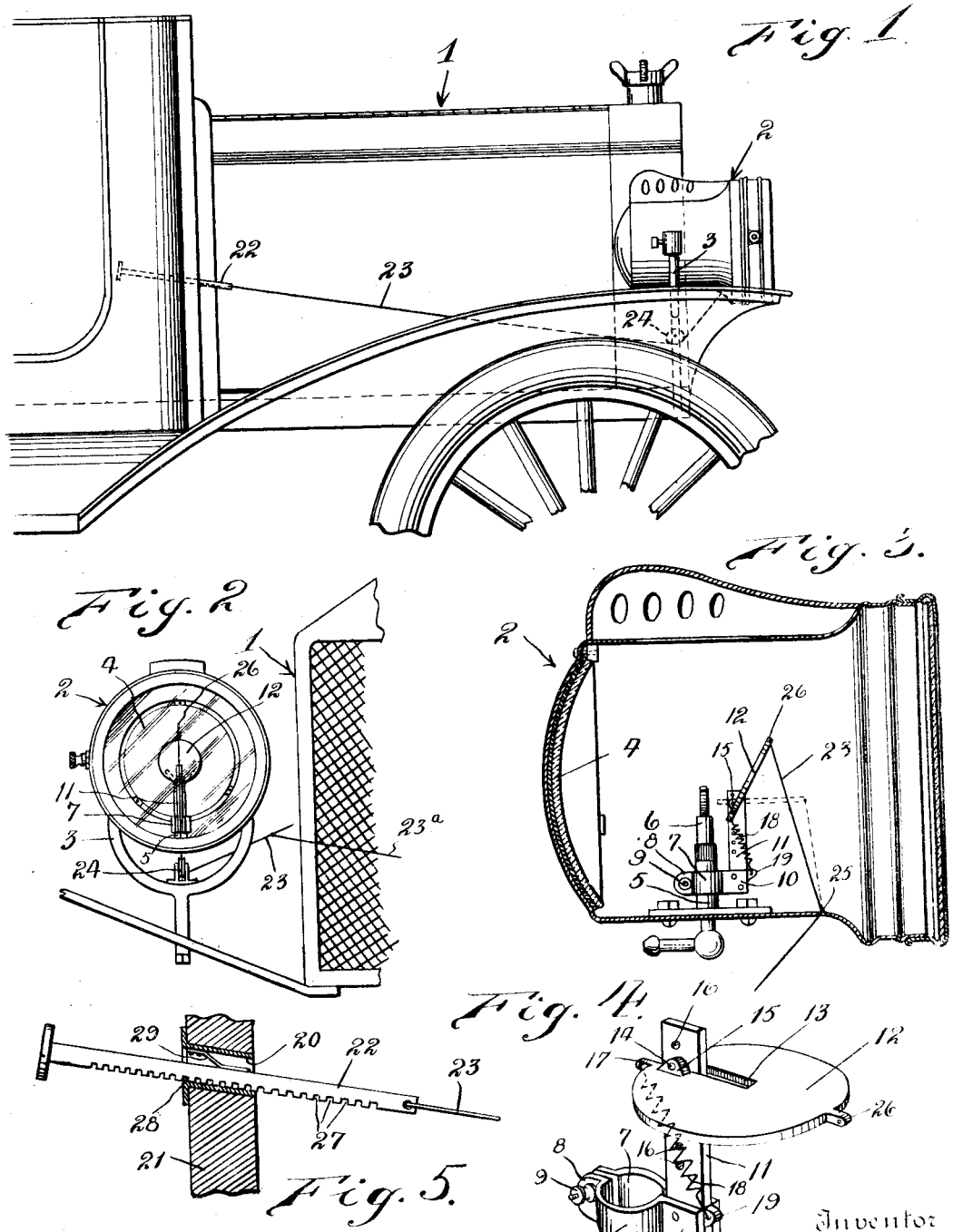

LESLIE EUGENE EATON, OF HOT SPRINGS, SOUTH DAKOTA.

HEADLIGHT-DIMMING ATTACHMENT.

1,128,959.  Specification of Letters Patent.  Patented Feb. 16, 1915.

Application filed November 5, 1914. Serial No. 870,480.

*To all whom it may concern:*

Be it known that I, LESLIE E. EATON, a citizen of the United States, residing at Hot Springs, in the county of Fall River and State of South Dakota, have invented certain new and useful Improvements in Headlight-Dimming Attachments, of which the following is a specification.

My invention relates to automobile headlights, especially to that type comprising a powerful parabolic reflector disposed back of an acetylene light, and has for its object the provision of means operated from the dash of the automobile whereby the rays of light emanating from and near the focus of the reflector may be cut off, thereby eliminating the well known blinding glare common to headlights. When this type of headlight is in use, it is well known that the glare caused by the strength of the light emitted therefrom is such as to blind pedestrians and operators of approaching automobiles, which has often resulted in serious accidents. In fact in many localities laws have been passed prohibiting the use of such headlights without some means of dimming them. These regulations have resulted in the employment of various makeshifts for accomplishing this result, such as coating the glass with soap or paint or by attaching a shield of paper or cloth either inside or outside of the glass. The great objection to these makeshifts is that when the driver of an automobile has passed through a district wherein glaring headlights are prohibited and reaches the country where strong lights are requisite, it is necessary that he get out of the automobile and remove the soap, paint, paper, cloth or whatever makeshift he employed on the headlight, which is an inconvenient, time consuming and objectionable operation, especially in rainy weather. It is with these facts in view that the present invention has been designed, and it has for its further object the provision of a variably movable shield whereby the headlights may be used in the ordinary manner, as when passing through the country, or dimmed to a greater or less degree when passing through city streets.

An additional object is the provision of a device of this character formed as an attachment to any acetylene gas headlight and adjustable to fit burners of different sizes.

Other objects and advantages such as simplicity, cheapness in manufacture, ease of installation and operation, together with the general improvement of the art will be carefully brought out in the following description and illustrated in the accompanying drawings, in which:

Figure 1 is a fragmentary side elevation of the front portion of an automobile showing my operating means applied to a headlight, Fig. 2 is a fragmentary front elevation of a headlight and its associated parts showing my device applied thereto in its operative position, Fig. 3 is a longitudinal sectional view through a headlight showing my device applied thereto and showing it in its operative position by full lines, and in its inoperative position by dotted lines, Fig. 4 is a perspective view of my device detached from the headlight, and Fig. 5 is a fragmentary sectional view through the dash of the automobile showing my novel controlling means.

Referring more particularly to the drawings, the numeral 1 designates the front portion of any type of automobile having the ordinary headlight 2 mounted thereon by means of the usual bracket 3. The headlight 2 is of the well known type embodying a reflector 4, a burner base 5, and a burner 6.

In carrying out my invention I provide a clamp 7 formed in two sections, each having an ear 8 and clamped upon the burner base 5 by means of a suitable clamping screw 9. Each of the sections of the clamp 7 has formed thereon an extension 10 and between these extensions is rigidly secured an upright post 11, which extends in front of the burner base 5 and burner 6. A plate or disk 12, slotted as shown at 13 for the reception of the post 11 is pivoted upon the post by means of a pin 14 passing through ears 15 on the disk 12 and through a selected one of a plurality of holes 16 formed in the post 11. At its rear edge, the plate 12 is provided with an apertured lug 17 to which is connected one end of a coil spring 18 which has its other end connected with an apertured ear 19 on the lower portion of the post 11.

My device is applied to the headlight by placing the clamping member 7 about the burner base 5 and securing it in position by means of the clamping screw 9. The plate 12 is vertically adjustable by the means of the pin 14 and the holes 16 so that it will be at the proper height to be disposed in front of the light from the burner 6. The tension of the spring 18 will normally pull the rear edge of the plate 12 downwardly and cause the plate to be held in a substantially vertical position, the end of the slot 13 engaging the front edge of the post 11 and serving as a stop. When the plate 12 is in its normal position, just described, the rays of light passing from and near the focus of the reflector 4 will be cut off, thus greatly dimming the light and removing the glare.

In order that the position of the plate 12 may be varied to permit the full amount of light to be used or only a portion thereof, I provide controlling means operable from the inside of the automobile. This controlling means comprises a sleeve 20 secured through the dash 21 of the automobile and slidably receiving a rod 22 to the front end of which is connected a wire or cable 23 which extends forwardly alongside the hood and which is trained about a guide roller 24 secured upon the bracket 3 supporting the headlight 2. The cable 23 then extends upwardly through a small opening 25 in the headlight and is connected with an ear 26 formed on the front of the plate 12. The plate 12 being in its normal and dimming position as shown by full lines in Fig. 3, pulling back upon the rod 22 will pull the cable 23 rearwardly and consequently move the plate 12 into a horizontal position, shown by dotted lines in Fig. 3, out of the path of the rays of light, thus allowing the full power of the headlight to be used. It is of course obvious that a branch cable 23ª extends to a similar roller on the bracket of and into the other headlight.

In order that the plate 12 may be moved only partially, in order to vary the strength of the light by a small degree, I provide the rod 22 with a plurality of notches 27 any one of which may be engaged upon a lug 28 formed on the sleeve 20. A leaf spring 29 is secured within the sleeve 20 and bears upon the upper edge of the rod, holding it against movement. In order to move the rod 22 for operating the plate 12 it is necessary to move the inner end of the rod 22 upwardly against the resistance of the spring 29 thereby releasing the notch from engagement with the lug 28. The rod 22 may be then moved longitudinally until the light has been dimmed or brightened as desired, after which the rod 22 is merely released, whereupon the lug 28 will be reengaged by a notch.

Although I have shown and described my dimming device as being disposed in front of the burner 6, it will be readily understood that I may place it in back thereof. In this event instead of the light itself being obscured, merely its reflection would be obscured. It will also be understood that instead of having the plate 12 in a normally dimming position, I may arrange the parts so that the headlight will normally give out its maximum degree of light.

Having thus described my invention what I claim is:

1. An automobile headlight dimming device comprising a bracket detachably connected with the burner standard, a plate pivoted upon said bracket, said plate being normally held in a vertical position in front of the burner by a coil spring, and means operated from the dashboard of the automobile for moving said plate out of said vertical position to a horizontal position in front of the burner for the emission of the full light rays.

2. An automobile headlight dimming device comprising a clamping member detachably connected with the burner standard, an upright rigidly secured to said clamping member, a plate pivoted upon said upright and movable between a horizontal and a substantially vertical position in front of the focus of the reflector, means for normally holding said plate at one extremity of its movement, and means for moving said plate.

3. An automobile acetylene headlight dimming device comprising a clamping member detachably connected with the burner standard, an upright secured to said clamping member, a plate pivoted upon said upright and movable into a substantially horizontal position in front of the burner, and means for moving said plate.

4. An automobile acetylene headlight dimming device comprising a bracket connected with the burner standard, a plate pivoted on said bracket and adapted to be disposed in front of the burner, said plate being normally held in a vertical position in front of said burner by a coil spring and having a flexible connection with a rod mounted in the dashboard for controlling its movement to a horizontal position for the emission of all of the light.

5. An automobile headlight dimming device comprising a clamping member detachably connected with the burner standard, an upright rigidly secured to said clamping member, a plate pivoted upon said upright and movable between a horizontal and a substantially vertical position in front of the focus of the reflector, said plate being normally held in a vertical position in front of said reflector by a spring, and means for moving said plate to a horizontal position.

In testimony whereof I hereto affix my signature in the presence of two witnesses.

LESLIE EUGENE EATON.

Witnesses:
E. B. ADAMS,
E. R. JUCKETT.